Figure 1:
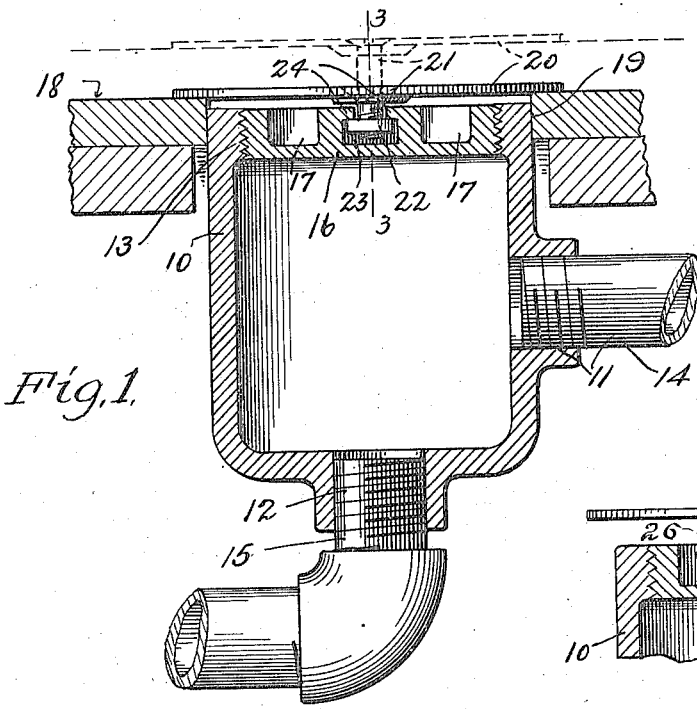
Figure 3:
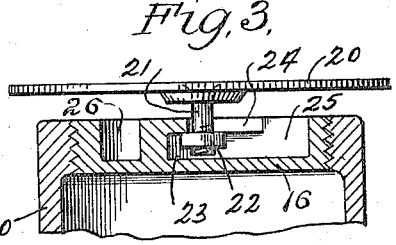
Figure 4:
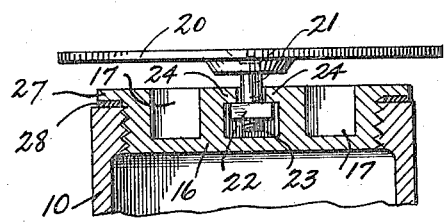
Figure 2:
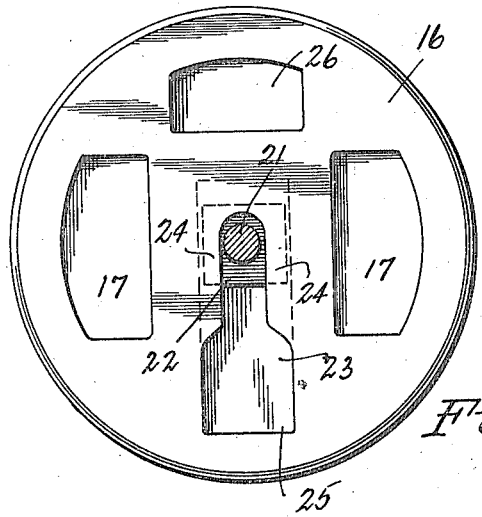

A. HARRIS.
TRAP.
APPLICATION FILED FEB. 29, 1916.

1,190,643.

Patented July 11, 1916.

Witnesses

Inventor
Archibald Harris
Edward Jay Wilson
Atty

UNITED STATES PATENT OFFICE.

ARCHIBALD HARRIS, OF CHICAGO, ILLINOIS.

TRAP.

1,190,643.

Specification of Letters Patent.  Patented July 11, 1916.

Application filed February 29, 1916. Serial No. 81,098.

*To all whom it may concern:*

Be it known that I, ARCHIBALD HARRIS, a citizen of the United States, and a resident of Chicago, Cook county, Illinois, have invented certain new and useful Improvements in Traps, of which the following is a specification.

My invention relates to improvements in traps and has particular reference to improvements in concealed traps for bath tubs and the like.

The object of my invention is to provide a trap of the above type together with means for closing and concealing the trap which shall facilitate the proper installation of the trap and its connections; which shall reduce the possibility of damage to the trap during building operations; which shall eliminate the necessity of constant inspection during the building operations and before the floor is laid; by means of which such devices can be much more easily installed in a safe and durable condition as respects the escape of sewer gas and by means of which the finishing plate can be properly placed without the necessity of that careful and accurate placement of the trap body which is a necessity for safety in the installation of the form of trap now commonly used.

My invention consists in a trap body of usual form provided with a large opening at its upper end, a closure for the opening adapted with the trap body to be installed below the floor line, means for removably mounting a nut on the closure and a floor or finishing plate adapted to be secured in place above the trap on the floor by means of a screw which engages with the nut.

My invention also consists in the several features of construction and in the combinations and arrangements of parts by which I am enabled to attain the above mentioned and other objects and all as hereinafter described and particularly pointed out in the appended claims.

My invention will be more readily understood by reference to the accompanying drawings forming a part of this specification and in which:

Figure —1— is a central, vertical, sectional view of a trap embodying my invention in one form; Fig. —2— is a top plan view of the trap closure shown in Fig. —1—; Fig. —3— is a detail vertical section on the line 3—3 of Fig. —1—; and Fig. —4— is a fragmentary vertical section similar to Fig. —1—, showing a modified form of closure.

In the modern practice of installing plumbing fixtures many of the pipes and connections are beneath the floor, particularly in connection with bath rooms and this is especially true of the traps which are used for bath tubs. These concealed fixtures, of necessity, have to be installed before the floors are finished and while the building is in course of construction. The usual method employed in installing bath tub traps of the character described is to place the top of the trap as near as may be at the level of the floor, but owing to the fact that when this work is done there is usually no positive or definite indication of the finished floor level the trap cannot be installed with any degree of assurance that when the job is finished it will be possible to properly close the trap. Furthermore, the usual practice is to close the trap, as first installed, with an ordinary screw pipe plug provided with a large square boss or head for the application of a wrench in placing and removing the plug. Frequently the large head projects above the floor level and interferes with the convenient bedding and laying of the tile flooring, with the result that the tiler removes the plug and is not careful to replace it again after he is through. Or even if he does replace the plug it frequently happens that he has permitted cement or other debris to fall into and choke the trap. Furthermore, it frequently happens that the trap, before it is protected by the floor, becomes slightly misplaced or tipped, and if this is not discovered and remedied before the floor is finished it may be difficult or impossible to correct this without considerable expense. This naturally leads to the worst condition relative to this matter and that is that when the plumber attempts to finally test and close the trap, he may find it impossible to properly and tightly close it due to its position relative to the floor and the floor opening with the result that he makes a patched up job of it, which looks fairly good and for the time being tests O. K. but which is a constant source of possible danger from sewer gas.

All of the above expensive and dangerous conditions and possibilities are avoided by the use of my invention.

While my invention has to do particularly with so-called water sealed traps, it will be obvious that certain features thereof may be employed with equal benefit in closing other openings than those of traps.

In said drawings, 10 is the body of a water seal trap having an outlet 11 at the side, an inlet 12 at the bottom and having a large free-hand hole opening 13 at its top. The openings 11 and 12 are adapted for connection to outlet and inlet pipes 14 and 15 respectively. The hand-hole opening 13 is preferably threaded to receive the closure 16 and in one form this threaded opening is tapered, and the edge of the closure 16 is likewise tapered, as is usual in pipe fittings, so that a gas tight joint can be produced between these two parts by screwing the closure into the opening a sufficient distance. In this form of closure, it is formed to enter into the trap until its upper surface is substantially flush with the upper edge of the body of the trap.

In installing my trap, the plumber sets it in such a relation to the future floor line that the top of the trap is below said floor line. There need be no great accuracy in this setting except to be certain that the top of the trap does not project above the floor line. The trap thus set is complete with its cap or closure and nothing projects above the floor line to interfere with the floor finishing operations.

I provide the closure 16 with oppositely disposed openings 17 for the reception of a suitable spanner for entering and removing the cap. The openings 17 are preferably large for the purpose of reducing the weight of the cap.

The trap being below the floor 18, and an opening 19 in the floor being necessary for giving access to the trap, I provide a thin finishing plate 20 with which to close this opening. I secure this plate in position by means of a screw bolt 21 and I provide a threaded nut 22 carried by the closure for engagement with the bolt. For convenience in placing the plate 20 and securing it in position, I provide the cap 16 with a central open-topped slot or opening 23 of a width to receive the nut 22 between its side walls but not to permit the nut to rotate therein. This slot 23 extends from the center of the cap outwardly toward the edge thereof and I provide its inner end with overhanging ledges 24 which are adapted to engage the nut 22 and hold it against the drawing action of the screw bolt 21 when the same is screwed down to secure the plate 20 in place. The outer end 25 of the slot 23 is free of the ledges 24 and consequently the nut 22 can be easily entered into the slot. For the sake of symmetry and to lighten the cap, I provide an opening or pocket 26 at the side opposite to the large end 25 of the slot 23.

I have indicated in dotted lines in Fig. —1— what might occur should it happen that the trap is placed lower, relatively to the floor line than is usually the case. Under this condition it is only necessary when it is desired to secure the finishing plate in place to select a bolt 21 of suitable length to properly engage the nut when the plate is in contact with the floor.

When installing the floor plate, the trap being in position, it is only necessary to place the screw bolt 21 in the plate with the nut 22 started onto the end of the bolt a few threads, and then lower the plate to enter the nut into the large end of the slot 23, after which the nut is moved horizontally into the center of the cap where it engages the ledges and the bolt is then tightened in place.

In the form of cap illustrated in Fig. —4—, instead of depending upon the tapered threaded connection between the cap and trap body to produce a tight joint, I provide the cap with a circumferential flange 27 adapted to clamp a packing ring 28 upon the upper end of the trap body. Some plumbers prefer this form of joint to the tapered form, although not so permanent in its character, as in this instance it is possibly easier to remove the cap after it has been installed a number of years.

My nut and screw connection between the finishing plate and the cap provides in effect a universal joint connection, due to the freedom of the nut in the slot and the freedom of the screw head in the plate and this permits the proper setting of the plate upon the floor even if the trap should be tilted over out of exact true vertical position. Furthermore, the joint between the cap and the trap body is independent of the setting of the plate or the distance of the top of the trap from the floor line which is not so in the form now commonly used, where the floor plate and the cap is in one piece, and in the use of which it is obviously a difficult matter to produce a tight joint between the cap and trap body and at the same time to properly set the plate upon the floor.

As many modifications of my invention will readily suggest themselves to one skilled in the art, I do not limit or confine my invention to the specific structures herein shown and described.

I claim as my invention:—

1. A closure for a water seal trap which is adapted to be concealed below a floor, comprising a relatively thin cap, the cap having an external screw thread for mounting the cap tightly upon a trap, said cap provided with means below its upper surface for removably retaining a threaded nut.

2. A closure for a water seal trap which is adapted to be concealed below a floor, comprising a cap, the cap having a screw-threaded periphery for mounting the cap tightly upon a trap, said cap provided with means below its upper surface for removably retaining a threaded nut, a floor plate adapted to rest at its edge upon a floor above the cap, and a screw engaging the nut and holding the plate in place.

3. A closure for a water seal trap which is adapted to be concealed below a floor, comprising a cap having an external screw thread and provided in its upper side with oppositely disposed wrench receiving sockets and provided with an elongated open slot in its upper side which crosses the center of the cap, said slot provided at the center of the cap with overhanging side ribs adapted to receive a threaded nut below them, the outer end of said slot being free of said ribs and permitting the entrance into and the removal from the slot of a nut.

4. A closure for a concealed water seal trap comprising a thin flat cap provided with an external screw thread, a nut receiving slot in its upper side which crosses the center of the cap, said slot being under cut at the center of the cap adapting it to retain a threaded nut and open at its outer end whereby a nut can be entered into and removed from the slot, in combination with a floor plate of larger diameter than said cap provided with a central opening for receiving a bolt, and a bolt adapted to connect said plate with said nut as and for the purpose specified.

5. Means for concealing a water seal trap beneath a floor, comprising a screw threaded cap for closing the trap, said cap provided with wrench receiving openings in its upper side and with a nut receiving and retaining slot between the wrench receiving openings, said nut receiving slot being formed at one end for permitting the free entrance and removal of a nut, a thin floor plate larger in diameter than the cap provided with a central bolt opening, a threaded nut in said nut receiving slot, and a screw threaded bolt in the central opening of the floor plate and entering said nut to removably secure the floor plate in position.

6. A closure for a water seal trap which is adapted to be installed below a floor level, comprising a trap cover adapted to be positioned below a floor level, a floor plate adapted to rest at its edge upon a floor above the trap and conceal same, and adjustable tension means for holding the plate and cap against separation and permitting the plate to be positioned out of parallel with the cap.

7. A closure for a concealed trap comprising a cap, means substantially in the plane of the cap for tightly mounting same upon a trap, a floor plate adapted to rest at its edge on a floor above a trap and conceal same, a bolt passing through the plate, a nut on the lower end of the bolt, and said cap provided with nut receiving slot in its upper side of a width to prevent the rotation of the nut, and having over-hanging ribs at one part adapted to resist the pull of the bolt, there being sufficient freedom between nut and cap to permit the engagement defined even though the cap may not lie parallel with the floor upon which the plate rests.

8. A closure for a water-seal trap comprising a trap-cover adapted to be positioned below a floor level, and a floor plate adapted to rest upon the floor around the opening adapted to give access to the trap, and means engaging the floor plate with the trap-cover adjustable to cause the plate to engage the floor and permitting said plate to adjust its position relatively to the trap-cover to bear equally on the floor along its periphery.

In testimony whereof, I have hereunto set my hand this 25th day of February 1916, in the presence of one subscribing witness.

ARCHIBALD HARRIS.

Witness:
EDWARD FAY WILSON.

Copies of this patent may be obtained for five cents each, by addressing the "Commissioner of Patents, Washington, D. C."